P. D. BREWSTER.
COLOR POSITIVE FILM.
APPLICATION FILED AUG. 10, 1914. RENEWED OCT. 16, 1918.
1,308,538.
Patented July 1, 1919.
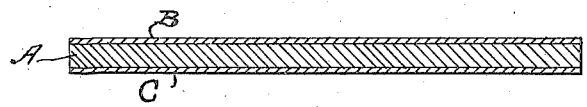
FIG-1-
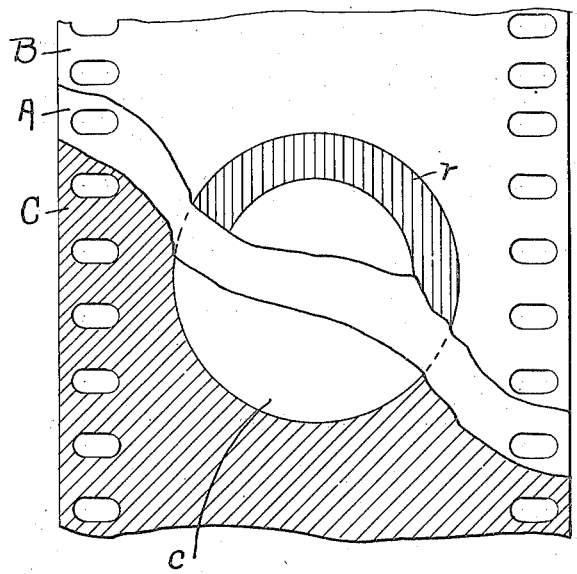
FIG-2-
WITNESSES:
INVENTOR
P. D. Brewster,
BY
Kerr, Page, Cooper & Hayward,
his ATTORNEYS.

UNITED STATES PATENT OFFICE.

PERCY D. BREWSTER, OF EAST ORANGE, NEW JERSEY, ASSIGNOR TO BREWSTER FILM CORPORATION, OF NEWARK, NEW JERSEY, A CORPORATION OF NEW YORK.

COLOR POSITIVE FILM.

1,308,538.      Specification of Letters Patent.      Patented July 1, 1919.

Application filed August 10, 1914, Serial No. 855,944. Renewed October 16, 1918. Serial No. 258,391.

*To all whom it may concern:*

Be it known that I, PERCY D. BREWSTER, a citizen of the United States, residing at East Orange, county of Essex, and State of New Jersey, have invented certain new and useful Improvements in Color Positive Films, of which the following is a full, clear, and exact description.

This invention relates to the staining or coloring of the images on the two sides of the positive film in two color photography or cinematography and its object is to improve the sharpness of the image projected upon the screen.

The invention comprises staining or coloring the silver forming the image on one side of a film in one color, staining or coloring the silver forming the image on the other side of the said film another color and dissolving out the silver in the emulsion on one side of the film with a suitable solvent, leaving the image on one side in dye or color alone while the image on the other side is formed by the silver and the dye or color.

In two color photography the image usually appears much more distinctly on one side of the film than on the other and by coloring the stronger silver images while the silver images on the other side of the film are replaced with images of pure dye or color, the images will be projected much sharper and with but little loss in transparency in the shadows due to the density of the silver. Leaving the silver images intact on one side is somewhat analogous to the use in four color printing of a key plate in black ink to be superposed over the three colors for the purpose of putting sharpness in the outline and blending together perfectly the outlines in the other colors. A secondary advantage of this method is that it tends to conceal any slight lack of registration between the images on the two sides of the film by making one image the primary image and the other the secondary image by which the colors are blended.

The structure of the film, greatly exaggerated in size and thickness for the sake of clearness, is illustrated in the accompanying drawing, in which Figure 1 is a cross-section of the film, showing the coatings on the two sides. Fig. 2 is a plan view of a piece of the film, with portions broken away to show the images on the two sides.

The base or support A is made of celluloid or other similar flexible material, coated on one side with an emulsion B and on the other with an emulsion C. Separate but registered images are formed in these emulsions by suitable photographic processes.

The positive with the images in silver on the two sides may be obtained by any process such as that described in my co-pending patent application Ser. No. 747,712, filed February 11, 1913 which describes a film coated on one side with a substantially transparent emulsion, sensitized to the green to violet color group in the spectrum, and on the other side with an emulsion specially sensitized for the red to yellow group, the film being exposed in a suitable camera through the transparent side, developed and fixed and the images on the two sides stained in different colors. The resulting color negative film may be printed by contact on a similarly prepared positive film which is developed and fixed and is then ready for staining.

This method may be modified in many ways, such as reversing the negative with sulfuric acid and potassium chromate, to obtain a positive directly from the film exposed in camera, or printing from a color negative on a double coated color sensitized positive that is not transparent by means of a camera, or the original negative may be made in the camera described in my patent application Ser. No. 815,153 filed January 29, 1914 in which similar images in suitable colors are projected simultaneously on the two sides of a double coated film, or the positive may be printed from a double negative film made according to my patent application Ser. No. 841,797, filed May 29th, 1914 which comprises two single coated negative films attached together face to face and exposed in the above mentioned camera after which the films are developed and fixed and the positive slipped between the negatives and printed from the two sides through the different negatives. Any method may be used for obtaining the registering images in silver on the two sides of the positive film without departing from my invention.

To color the silver images the silver is first converted into a silver salt, for example by "bleaching" with a ferricyanid solution with or without the addition of a lead salt. A 10% solution of potassium ferricyanid to which 1% of ammonia has been added acts as a bleach and the images on each side of the film may be toned by suitable metallic salts, such as ferric chlorid acidulated with hydrochloric acid for the blue, and vanadium and copper chlorid or vanadium and uranium chlorid for the orange red. The silver is dissolved out of the image on one side of the film by treating with any solvent such as potassium cyanid or with sodium thiosulfate (hypo) of 10% strength containing a little boric acid or sodium acetate.

The Traube process for coloring positives may be used in which the silver image is converted into silver iodid by a bath consisting of 10 grains potassium iodid and 20 grains potassium ferricyanid to the ounce of water and the two sides treated separately, in baths of basic dyes of suitable colors and of a strength of approximately a grain of dye to ounce of water. The silver iodid is dissolved out of one side of the film by treating that side only with a 10% solution of sodium thiosulfate containing some tannin and sodium acetate.

The two sides of the film may be treated separately in a double metallic frame lined on the inside with rubber, the film being placed between the two frames which are adapted to engage the film around the edges, and to form a trough on either side with the film for the bottom, suitable clamps being arranged to hold the rubber in contact with the film and prevent leakage of the treating baths.

In Fig. 2 I have illustrated a portion of a film bearing images on its two sides by which there can be projected on a screen a representation of a red ring or annulus with a white center, on a green field or background. For this purpose the image in one of the emulsions, for instance emulsion B, is a red ring $r$, as indicated by the vertical shading, the emulsion inside and outside the ring being colorless and transparent. On the other side the circle $c$, registering with the ring $r$, is colorless and transparent, but outside of the circle the emulsion is green, as indicated by the diagonal shading. The celluloid support A is also transparent and colorless. When the film is projected, the emulsion B outside ring $r$ permits white light to pass but all but the green rays are stopped by the emulsion C outside of the circle $c$. Hence the background on the screen is green. The ring $r$ permits only red rays to pass, and hence a red ring is seen on the screen, inside the circle in the green background. The circle $c$ and the center of the ring $r$ being colorless, white light is transmitted through the inside of the ring to the screen, causing a white center to be seen thereon.

The image on the side of the film nearer the condensing lens must be projected through the film support and necessarily some of the sharpness in the image lost by diffusion so that it is preferable to have the pure dye on the side of the film toward the lens and the silver and dye on the other side so that the image passing through the support will add a color blend to the positive and the image on the other side the necessary sharp definition of outline.

It is to be understood that the invention is not limited to the form herein specifically described but can be embodied in other forms without departure from its spirit.

What I claim is:

1. A photographic film consisting of a transparent support having an image in one color on one side, and a similar registering image on the other side consisting of a mixture of a silver salt and another suitable color.

2. A photographic film comprising a transparent support coated on both sides with gelatin emulsion, having an image in one color on one side, the said color being embedded in the gelatin of the emulsion on that side, and a similar registering image on the other side consisting of color and silver salts embedded in the gelatin of the emulsion coated on such side of the said support.

In testimony whereof I affix my signature in the presence of two subscribing witnesses.

PERCY D. BREWSTER.

Witnesses:
 M. LAWSON DYER,
 THOMAS J. BYRNE.